United States Patent
Greenberger et al.

(10) Patent No.: US 10,140,859 B1
(45) Date of Patent: Nov. 27, 2018

(54) AMELIORATION OF TRAFFIC GRIDLOCK CONDITIONS

(71) Applicant: International Business Machines Corporation, Armonk, NY (US)

(72) Inventors: Jeremy A. Greenberger, Raleigh, NC (US); Zachary M. Greenberger, Raleigh, NC (US); Clifford A. Pickover, Yorktown Heights, NY (US); Komminist Weldemariam, Nairobi (KE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/679,889

(22) Filed: Aug. 17, 2017

(51) Int. Cl.
 *G08G 1/07* (2006.01)
 *G08G 1/01* (2006.01)
 *G08G 1/0968* (2006.01)
 *G08G 1/096* (2006.01)

(52) U.S. Cl.
 CPC ............. *G08G 1/07* (2013.01); *G08G 1/0145* (2013.01); *G08G 1/096* (2013.01); *G08G 1/0968* (2013.01)

(58) Field of Classification Search
 CPC ............. G08G 1/00; G08G 1/01; G08G 1/048; G08G 1/056; G08G 1/07; G08G 1/08; G08G 1/081; G08G 1/087; G08G 1/09; G08G 1/093; G08G 1/095; G08G 1/096; G08G 1/0968; G08G 1/0969
 See application file for complete search history.

(56) References Cited

U.S. PATENT DOCUMENTS

| 3,818,429 | A | 6/1974 | Meyer et al. |
| 4,692,764 | A | 9/1987 | Bonar |
| 5,170,858 | A | 12/1992 | Chen |
| 5,278,554 | A | 1/1994 | Marton |
| 5,314,037 | A | 5/1994 | Shaw et al. |
| 5,332,056 | A | 7/1994 | Niibe et al. |
| 6,366,219 | B1 | 4/2002 | Hoummady |
| 6,617,981 | B2 | 9/2003 | Basinger |
| 8,248,272 | B2 | 8/2012 | Arnold et al. |
| 8,340,894 | B2 * | 12/2012 | Yester ............. G08G 1/163 340/436 |
| 8,773,281 | B2 | 7/2014 | Ghazarian |
| 9,412,271 | B2 * | 8/2016 | Sharma ............. G08G 1/052 |
| 9,852,624 | B2 * | 12/2017 | Ginsberg ............. G08G 1/07 |
| 2005/0137783 | A1 | 6/2005 | Dort |
| 2007/0276600 | A1 | 11/2007 | King et al. |

(Continued)

FOREIGN PATENT DOCUMENTS

| CN | 101249825 A | 8/2008 |
| CN | 203284741 U | 11/2013 |

OTHER PUBLICATIONS

Mitch Bainwol, "Automotive Innovation Drives Growth and Modernization Across the Country," http://www.rollcall.com/news/-240651-1.html#sthash.5EsSGKIM.fD7NfL8W.dpuf, Mar. 12, 2015, 2 pages.

(Continued)

*Primary Examiner* — Van Trieu
(74) *Attorney, Agent, or Firm* — Udi Einhorn; Ryan, Mason & Lewis, LLP

(57) ABSTRACT

A risk of at least one vehicle blocking an intersection is determined. One or more ameliorative actions are determined based on the risk. At least one of the one or more ameliorative actions are performed.

16 Claims, 8 Drawing Sheets

(56) References Cited

U.S. PATENT DOCUMENTS

| | | | |
|---|---|---|---|
| 2011/0087433 A1* | 4/2011 | Yester | G08G 1/163 |
| | | | 701/301 |
| 2015/0110344 A1 | 4/2015 | Okumura | |
| 2016/0055744 A1* | 2/2016 | Branson | G08G 1/07 |
| | | | 340/916 |
| 2016/0203717 A1* | 7/2016 | Ginsberg | G08G 1/07 |
| | | | 701/117 |
| 2017/0263174 A1* | 9/2017 | Chen | G09G 3/2003 |

OTHER PUBLICATIONS

Wikipedia, "Gridlock," https://en.wikipedia.org/wiki/Gridlock#Cause, Mar. 30, 2017, 5 pages.

S. Lammer et al., "Self-Healing Networks—Gridlock Prevention with Capacity Regulating Traffic Lights," IEEE 6th International Conference on Self-Adaptive and Self-Organizing Systems Workshops (SASOW), Sep. 10-14, 2012, pp. 61-65.

Lisa Cohen, "Traffic Lights on Your Windshield Could Get You Home Faster," http://www.cnn.com/2015/01/14/tech/virtual-traffic-lights-windshield/, Jan. 14, 2015, 1 page.

Weiss & Associates, PC, "Blocking the Box (aka Gridlocking) No Longer a Moving Violation in New York City," http://nytrafficticket.com/blocking-the-box-no-longer-a-moving-violation-in-new-york-city/, Mar. 21, 2017, 2 pages.

youtube.com, "Samsung Safety Truck Screens on Back of Trucks Display Front Road," https://www.youtube.com/watch?v=LJDZ-_AGhvw Jun. 24, 2015, 3 pages.

phys.org, "Length of Yellow Caution Traffic Lights Could Prevent Accidents: Study," http://phys.org/news/2012-09- length-yellow-caution-traffic-accidents.html, Sep. 11, 2012, 3 pages.

copradar.com, "Braking Factors," http://copradar.com/redlight/factors/, Apr. 24, 2017, 5 pages.

youtube.com, "Why You Shouldn't Brake Heavily for an Amber Light," https://www.youtube.com/watch?v=i3pvrpKDjRQ, Oct. 8, 2014, 2 pages.

www.driversedguru.com, "What to do When the Light Turns Yellow," http://www.driversedguru.com/driving-articles/drivers-ed-extras/what-to-do-when-the-light-turns-yellow/, Apr. 24, 2017, 2 pages.

Jeremy Laukkonen, "What is an Automatic Braking System?" http://cartech.about.com/od/Safety/a/What-Is-An-Automatic-Braking-System.htm, Mar. 20, 2017, 2 pages.

U.S. Appl. No. 15/416,884, filed in the name of Stacy F. Hobson et al. on Jan. 26, 2017.

* cited by examiner

100

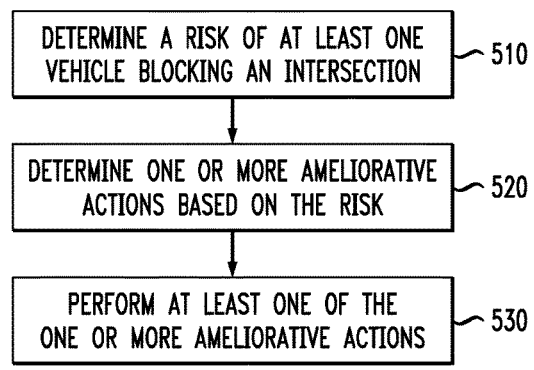
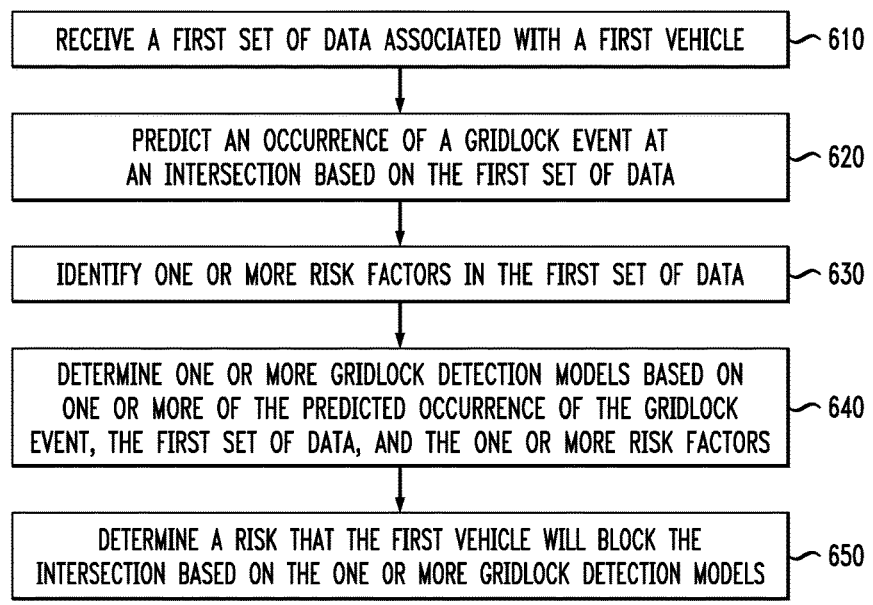

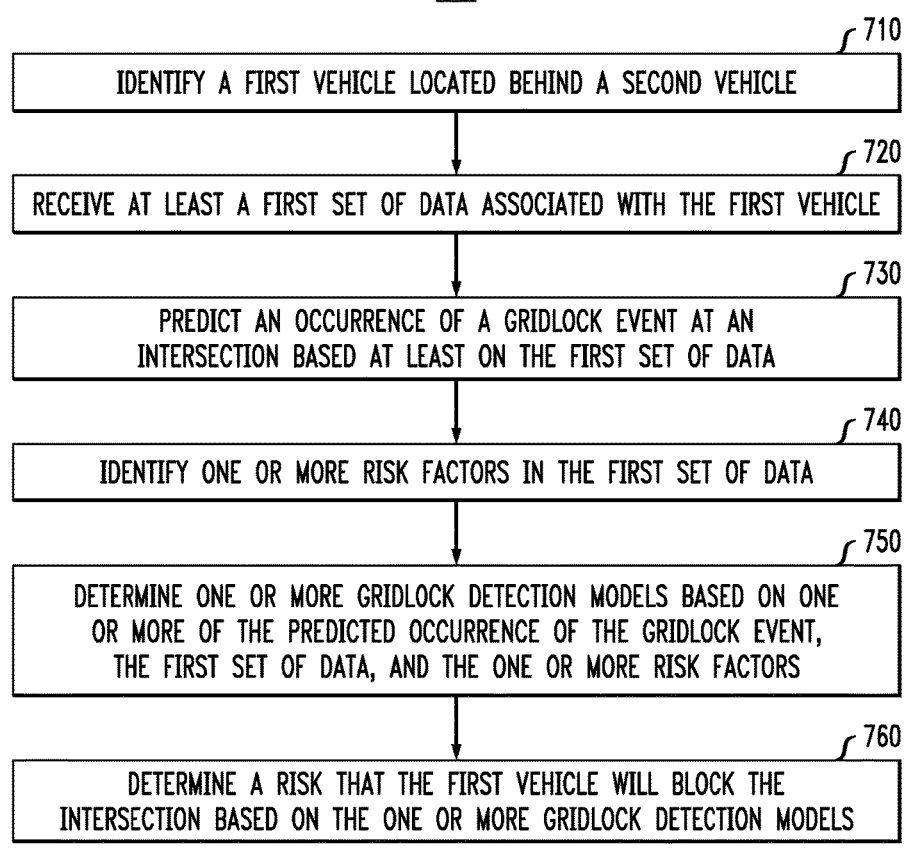

AMELIORATION OF TRAFFIC GRIDLOCK CONDITIONS

BACKGROUND

A traffic jam may refer to a situation in which there is high vehicle congestion with minimal flow. Gridlock may be defined as a type of traffic jam where continuous queues of vehicles block an entire network of intersecting streets, thereby bringing traffic in all directions to a standstill. Traditionally, gridlock is caused by traffic heading in one direction across an intersection, and then the traffic being stopped due to a blockage in the intersection. The blockage may result from, for example, vehicle overcapacity and vehicle accident. Gridlock is cited as example of a "prisoner's dilemma" problem of game theory. Mutual cooperation among drivers would provide the maximum benefit (e.g., prevention of gridlock), but such mutual cooperation may not happen due to individual drivers seeking to maximize their own benefit (e.g., shortest travel time) given the uncertainty about the other drivers' commitments to mutual cooperation.

To combat gridlock, many jurisdictions have enacted rules prohibiting motorists from entering an intersection at a green light, if there is no room for them to clear the intersection, in the prevention of what is colloquially known as "blocking the box." Adhering to these rules minimizes the occurrence of gridlock and traffic will only slow in the direction that is actually congested. Additionally, a box junction may be utilized to reduce gridlock. A box junction is a road traffic control measure provides drivers with a clear visualization as to where the junction is. The surface of the box junction is typically marked with a crisscross grid of diagonally painted lines (or only two lines crossing each other in the box). Vehicles may not enter the marked area unless their exit from the junction is clear or, if turning, to await a gap in the oncoming traffic flow.

SUMMARY

Embodiments of the present invention relate to techniques for reducing traffic gridlock.

For example, in one embodiment, a method for reducing traffic gridlock comprises determining a risk of at least one vehicle blocking an intersection. One or more ameliorative actions are determined based on the risk. At least one of the one or more ameliorative actions are performed. The steps are implemented by at least one processing device comprising a processor operatively coupled to memory.

For example, in another embodiment, an article of manufacture for reducing traffic gridlock comprises a processor-readable storage medium for storing processor-readable program code which, when executed, causes a processor to implement the steps of: determining a risk of at least one vehicle blocking an intersection; determining one or more ameliorative actions based on the risk; and performing at least one of the one or more ameliorative actions.

For example, in yet another embodiment, an apparatus to generate personalized routes optimized for users of mobility assisting technology comprises at least one processing device comprising a processor operatively coupled to a memory and configured to: determine a risk of at least one vehicle blocking an intersection; determine one or more ameliorative actions based on the risk; and perform at least one of the one or more ameliorative actions.

BRIEF DESCRIPTION OF THE DRAWINGS

FIG. 5 depicts a flowchart illustrating an overview of a process for detecting and ameliorating a risk of gridlock, according to an embodiment of the present invention.

FIG. 6 depicts a flowchart illustrating an exemplary process for determining a risk of at least one vehicle blocking an intersection, according to an embodiment of the present invention.

FIG. 7 depicts a flowchart illustrating an exemplary process for determining a risk of at least one vehicle blocking an intersection, according to an embodiment of the present invention.

DETAILED DESCRIPTION

Vehicles are becoming more advanced in the onboard systems and technologies available to increase safety during travel. Some vehicles are able to use sensors and/or other technologies to identify various aspects associated with the vehicle, including but not limited to positioning, trajectory, speed, path and objects in the vicinity. These aspects may be used to assess a current vehicle situation and a likelihood of some issue occurring. In many cases, the vehicle may be able to make this assessment faster and more accurately than the driver of the vehicle.

Illustrative embodiments herein consider the case where a driver is approaching an intersection. The driver may have to make a decision of whether he or she should proceed past the intersection, or stop before the intersection. Ultimately, the driver must determine whether he or she believes it is possible to make it through the intersection without "blocking the box." Drivers tend to base their decision on incomplete or inaccurate information. For example, drivers may misjudge things such as (1) length of the intersection; (2) the time it would take for the vehicle to clear the intersection; (3) the distance from the vehicle's current position to the beginning of the intersection; and (4) where the vehicle in front of them will ultimately stop moving. Additionally, reaction time for applying the brakes may vary depending on age, skill level and cognitive state. If the driver makes the wrong decision by attempting to pass through an intersection and getting stuck in the box, this may lead to traffic gridlock (as well as potential traffic citations if police are present).

The present invention aims to reduce traffic gridlock to more accurately determine whether a vehicle should proceed through the intersection or stop prior to entering the intersection. However, it is to be understood that embodiments of the invention are not limited to the illustrative methods, systems and devices but instead are more broadly applicable to other suitable methods, systems and devices.

Figure 1:
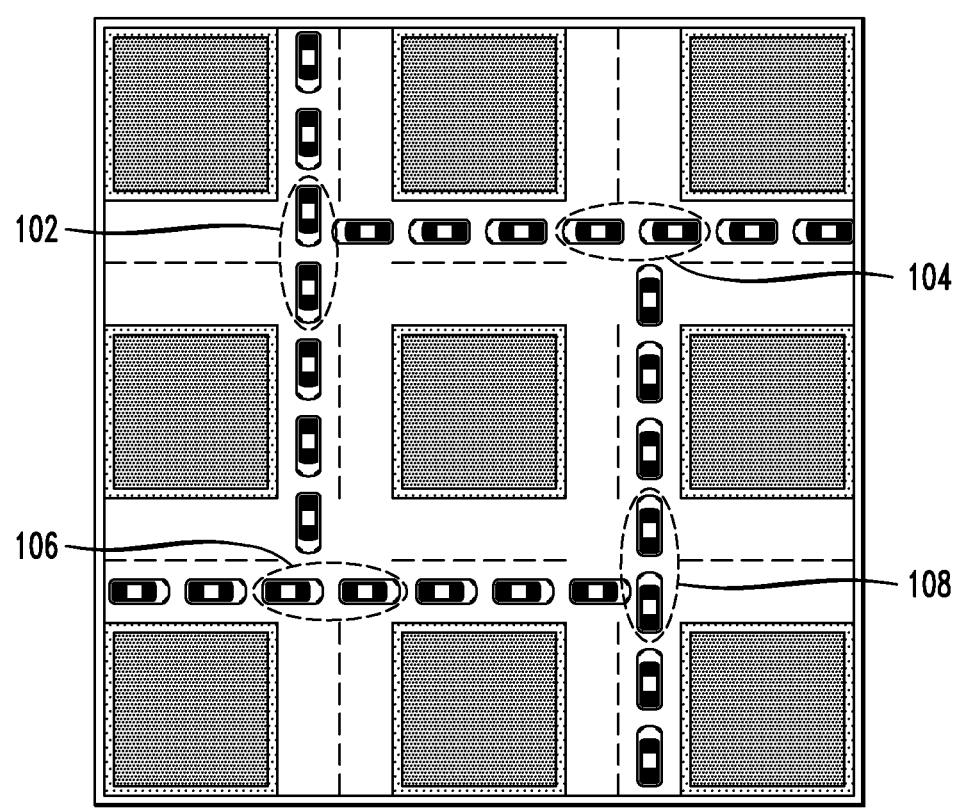
FIG. 1 depicts an illustration of traffic gridlock.

FIG. 1 depicts an illustration of network of streets 100 in which there is traffic gridlock. Although network of streets 100 is shown illustratively as a network of two-way streets, illustrative embodiments described herein may be applied to any type of network of streets. Traffic gridlock is caused by groups of cars blocking intersections 102 through 108.

Figure 2:
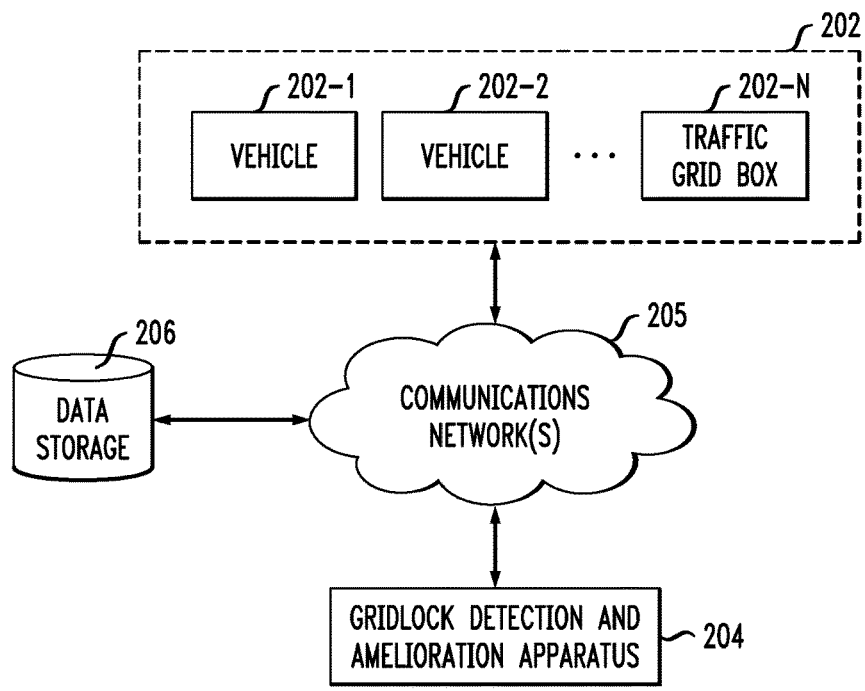
FIG. 2 depicts a block diagram illustrating a system for gridlock detection and amelioration, according to an embodiment of the present invention.

FIG. 2 depicts a block diagram of a system 200 configured to detect and ameliorate gridlock. System 200 may include one or more entity systems 202, gridlock and amelioration apparatus (apparatus) 204 and data storage 206 connected over one or more communications networks 205. As shown in this illustrative embodiment, one or more entity systems 202 comprise N entity systems, including vehicle 202-1, vehicle 202-2 and traffic grid box 202-N. Each vehicle may be associated with at least one user (e.g., a driver). One or more of vehicles 202-1 and 202-2 may be an autonomous or self-driving vehicle.

In one embodiment, apparatus 204 is implemented by a processing device comprising a processor operatively coupled to a memory (e.g., a server). The processing device may be a server, such as a cloud-based server. Apparatus 204 may be provided by different servers or other processing devices in one or more multiple clouds. In addition, it is to be appreciated that embodiments do not require use of clouds or cloud-based servers.

Apparatus 204 is configured to determine a risk of blocking intersection 202-N, such as blocking a traffic grid box ("box") corresponding to intersection 202-N. For example, apparatus 204 may be configured to determine a risk the at least one of vehicle 202-1 and vehicle 202-2 will block intersection 202-N. The determination may be made in real-time or near real-time. Then, in order to prevent gridlock due to the risk of blocking intersection 202-N, apparatus 204 is further configured to generate one or more ameliorative actions based on the risk, and perform at least one of the one or more ameliorative actions. Data storage 206 may comprise data that may be used by apparatus 204 to determine the intersection blockage risk. For example, data storage 206 may comprise mobility data associated with respective vehicles, risk factor data, one or more risk models and one or more gridlock models. At least a portion of the data may be crowdsourced. Further details regarding the implementation of system 200 will now be discussed with reference to FIGS. 3-8.

Figure 3:
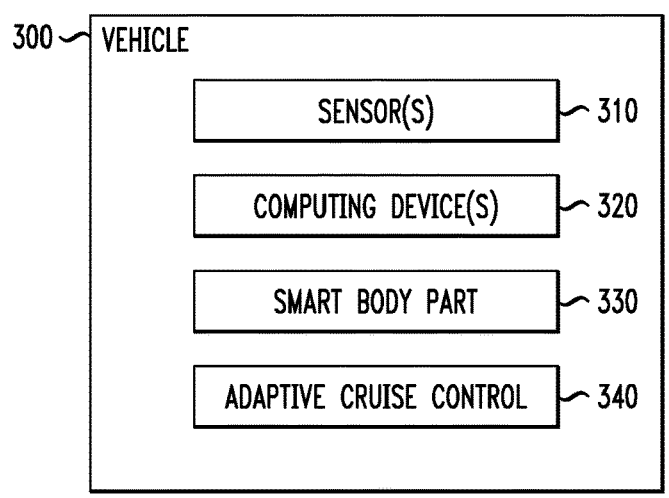
FIG. 3 depicts a block diagram illustrating an exemplary gridlock detection and amelioration apparatus for implementation in the system of FIG. 2, according to an embodiment of the present invention.

FIG. 3 depicts a block diagram illustrating exemplary components of a vehicle 300, such as one or more of vehicles 202-1 and 202-2 from FIG. 2. As shown, vehicle 300 may comprise one or more of sensors 310, one or more computing devices 320 associated with vehicle 300, smart body part 330, and adaptive cruise control 340. Computing device(s) 320 may include a computing device built into a dashboard of vehicle 300, a computing device built into a portion of the front windshield of vehicle 300, a mobile device associated with a driver of vehicle 300, and/or any other computing device that may be associated with vehicle 300 or the driver configured to implement the illustrative embodiments described herein.

Sensor(s) 310 may include one or more of, for example, a video sensor, a laser sensor, a radar sensor, and an infrared sensor. Sensor(s) 310 may be configured to identify an upcoming intersection and details relating to the upcoming intersection. Sensor(s) 310 may be further configured to compute one or more metrics associated with the vehicle. These metrics may include, for example, proximity distance and vehicle size. The computed metrics may be implemented to determine when an ameliorative action should be triggered (e.g., when it is determined that the view of the vehicle is occluded by another vehicle).

Sensor(s) 310 may be configured to judge distance and time metrics associated with safely clearing an intersection. For example, sensor(s) 310 may determine: (1) a length of an intersection; (2) a time it would take vehicle 300 to clear the intersection; (3) the distance from a current position to the beginning of the intersection; and (4) a remaining time for the traffic light at the intersection to turn from a yellow light to a red light. At least a portion of the data obtained by sensor(s) 310 may be used by a gridlock detection and amelioration apparatus, such as apparatus 204 from FIG. 2, in order to determine a risk blocking an intersection. For example, at least a portion of the data obtained by sensor(s) 310 may be used to determine whether vehicle 300 itself is at risk of blocking the intersection, to determine whether vehicle 300 is at risk of causing a vehicle positioned behind vehicle 300 to block the intersection, etc.

Sensor(s) 310 may further include global positioning system (GPS) sensor technology. Geolocation-based analytics with temporal parameters may be used to determine the identity of a given intersection being approached by vehicle 300, and whether the given intersection has a history of vehicles causing gridlock, such as by blocking the box at the given intersection. This information may be used by the gridlock detection and amelioration apparatus in assessing the risk of gridlock associated with the given intersection.

An example of ameliorative action include displaying a visualization associated with a status of the intersection on one or more of computing devices 320 of vehicle 300. The visualization may be associated with a current color of the traffic light, may comprise an image or video feed of the intersection, or may be associated with any type of display that may be used to assist the driver to avoid blocking the intersection and reduce the risk of gridlock. Such an ameliorative action may be particularly advantageous in the event that a view ahead of vehicle 300 is being occluded, such as by a large vehicle (e.g., a truck). In such an event, in order to prevent vehicle 300 from blocking the intersection, the status of, for example, the traffic light at the intersection may be displayed on one or more of display device(s) 320. Additionally or alternatively, an alert message may be generated and transmitted to one or more of computing device(s) 320 in order to warn the driver of vehicle 300 of the risk of blocking the box and causing gridlock. For example, the alert message may include a warning of a fine for blocking the box in the particular jurisdiction that the vehicle is driving through. The alert may be issued in one or more forms, such as audio, visual, etc.

Another example of an ameliorative action may include displaying a status associated with the intersection to a vehicle positioned behind vehicle 300. Such an ameliorative action may be particularly advantageous in the event the vehicle 300 is occluding the view of the vehicle positioned behind vehicle 300 (e.g., if vehicle 300 is a truck). In such an event, in order to prevent the vehicle positioned behind vehicle 300 from blocking the intersection, a visualization associated with a status of the intersection may be displayed on the back of vehicle 300. For example, the visualization may be displayed on a smart body part 330 of vehicle 300 visible to the driver of the vehicle positioned behind vehicle 300. The visualization may comprise a status of the traffic light, or may comprise an image or video feed of the intersection. In order to reduce complications and distractions while driving, the display of smart body part 330 may be toggled on and off autonomously based on the analysis of activity in the intersection. That is, the display of smart body part 330 may dynamically and autonomously turn on and off when there is no need for the display of smart body part 330 to be on (e.g., when the vehicle behind vehicle 300 has a perfectly unobscured view of the traffic light at an intersection).

Depending on an analysis of weather conditions associated with visibility (e.g., foggy weather with poor visibility), one or more of the brightness, color, etc. may be dynamically adapted or adjusted on smart body part 330. For example, smart body part 330 may control the display. Smart body part 330 may be further utilized to display crossing pedestrians or non-motorized vehicles (e.g., wheelchairs and bicycles) based on an assessment the vehicle behind vehicle 300.

Additionally, an interface (e.g., graphical user interface (GUI) or voice command) may be provided for vehicle 300 to control the smart body part, such as how to position the information (e.g., displaying traffic lights and passing pedestrians) for display on smart body part 330. Such considerations may be useful with respect to vehicle convoys comprised of multiple related vehicles following one another.

Yet another example of an ameliorative action may include a signal transmitted to control the functioning of vehicle 300 in order to reduce the risk of blocking the box and causing gridlock. For example, the signal may be sent to an adaptive cruise control 340 to cause vehicle 300 to slow down or speed up. This embodiment may be particularly advantageous if vehicle 300 is an autonomous or self-driving vehicle.

Figure 4:
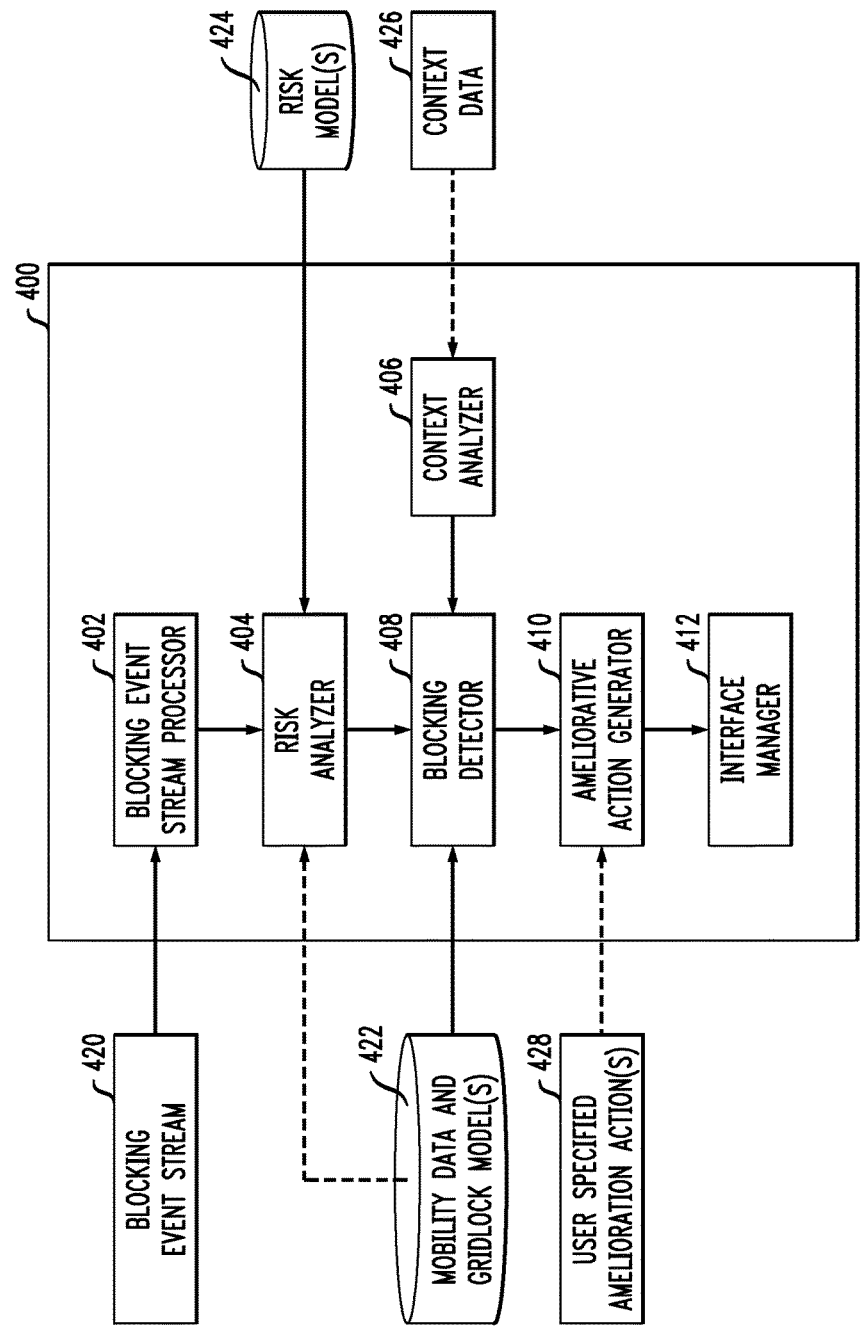
FIG. 4 depicts a block diagram illustrating components of a vehicle, according to an embodiment of the present invention.

FIG. 4 shows a block diagram of an exemplary implementation of a gridlock detection and amelioration apparatus 400, such as apparatus 204 of FIG. 2. Apparatus 400 is shown having components 402 through 412, including blocking event stream processor 402, risk analyzer 404, context analyzer 406, blocking detector 408, amelioration action generator 410 and interface manager 410. Although the components are shown as individual blocks, it is to be understood that this illustrative embodiment is exemplary, and that sub-components 402 through 416 may be implemented as a single component, or as a combination of sub-combinations of components. For example, components 402 through 408 may be embodied as sub-components of a single gridlock detector component.

Blocking event processor 402 is configured to process a received blocking event stream 420. Blocking event stream 420 may comprise information regarding an intersection being in a state of gridlock or being blocked. Examples of information that may be comprised in blocking event stream 420 include: the duration of the intersection being blocked, the kinds of vehicles associated with the blocking (e.g. trucks, motorcycles, a police car with flashing lights), the amount or degree of blocking (which may include the number of vehicles involved), road conditions at the intersection, lighting conditions, etc.

Risk analyzer 404 is operatively coupled to blocking event stream processor 402 and is configured to analyze a risk that an intersection will be blocked. The analysis may be performed in real-time or near real-time. In one embodiment, and as shown, risk analyzer 404 receives data comprising mobility data and one or more gridlock models 422, and one or more risk models 424, and analyzes the risk based at least in part on this received data. The mobility data may comprise mobility data associated with a first vehicle, and/or mobility data associated with a second vehicle positioned behind the first vehicle. The gridlock model(s) may comprise models that were created and stored associated with gridlock. Each model may be updated in real-time or near real-time in order to more accurately determine the risk of gridlock happening at the intersection via cognitive computing and/or machine learning methods. Mobility data and gridlock model(s) 422 may comprise crowdsourced data.

Context analyzer 406 is configured to analyze context data 426 associated with the intersection. For example, the context data may comprise risk factor data. Risk factor data may include data associated with traffic light timings, driving speed, proximity sensor or GPS data, types of vehicles near the intersection (e.g., tall trucks), time of day (including day versus night), weather and road conditions, a history of blocking the box, the type of intersection and nearby accident conditions, etc. For example, if the intersection has a history of vehicles repeatedly blocking the box, this information may be used to identify that the intersection has a high block risk and thus may be factored into the determination of the risk of gridlock associated with the intersection. In one embodiment, the risk factor data may be stored in an array (e.g., a high-dimensional array).

Blocking detector 408 is shown operatively coupled to risk analyzer 404 and context analyzer 406. Blocking detector 408 is configured to detect whether the intersection is being blocked, or is at risk of being blocked, based at least in part on the analyses performed by risk analyzer 404 and context analyzer 406. The detection may be performed in real-time or near real-time. Blocking detector 408 may further receive data comprising mobility data and one or more gridlock models 422 in order to perform the blocking detection.

Apparatus 400 may be configured to determine the risk that the intersection will be blocked and/or determine that the intersection is blocked by performing a video analysis of occurrences at or around the intersection and/or by performing an analysis of signals emitted from one or more vehicles. The analysis of signals may be further extended to an analysis of signals of mobile devices detected inside vehicles. For example, apparatus 400 may optionally track positions of vehicles by using the mobile devices detected inside the vehicles. Additionally, the analysis of signals may be further extended to an analysis of information obtained from pedestrians near the intersection. For example, apparatus 400 may optionally obtain information from pedestrians via pedestrian mobile device data.

Apparatus 400 may employ algorithms to gather and learn information associated with the intersection environment in order to optimize the risk determination computation. The information may include information on pedestrians, signals, crosswalks, traffic signs (e.g., one-way signs), etc. The information may also include information associated with a type and/or complexity of the intersection. Arrows on the road may be information considered by apparatus 400. In addition, diverging, merging and crossing types of conflicts may also be considered by apparatus 400. Information obtained and learned during an analysis of one intersection may sometimes be used for analyzing another related intersection.

Apparatus 400 may be configured to detect or predict when a vehicle is blocking the box at the intersection within a proximity distance, L, based on the gridlock detection models. This detection or prediction may be performed based on, for example, traffic light timings, vehicle speed, proximity sensor or GPS, deep learning or visual analytics, etc.

Ameliorative action generator 410 is shown operatively coupled to context analyzer 406 and blocking detector 408 and is configured to generate or determine one or more ameliorative actions. The one or more ameliorative actions may comprise one or more of transmitting an alert message in order to warn the driver of the risk of blocking the box and causing gridlock, displaying a visualization associated with a status of the intersection, and transmitting a signal to control the functioning of the vehicle, as discussed above in FIG. 3. In one embodiment, ameliorative action generator 410 is further configured to receive user specified amelioration action(s) 428.

Apparatus 400 may utilize one or more sets of rules to determine effective ameliorative actions. For example, apparatus 400 may be configured to learn a likely effectiveness of ameliorative actions in relation to one or more properties of the intersection. Examples of such properties include, but are not limited to, the type of intersection, terrain, and elevation (e.g., whether the intersection is located within a valley or atop a hill).

Optionally, apparatus 400 may further include interface manager 412, which is shown in FIG. 4 operatively coupled to ameliorative action generator 410. Interface manager 412 may be associated with an interface (e.g., a graphical user interface (GUI) or voice command) provided to the driver of the blocking vehicle. For example, interface manager 412 may be used to control how to display information and the position of the information to display on smart body part (e.g., displaying traffic lights or a passing pedestrians). Such considerations may be useful with respect to vehicle convoys comprised of multiple related vehicles following one another.

Conditions relevant to the intersection may be transmitted in the various manners described herein. For example, if a streetlight is out of service, an indication of this condition may be transmitted and accessed by other drivers for planning a route. If desired, these conditions may be viewed on a mapping application or website.

Apparatus 400 may cooperate with additional systems from neighboring intersections to gather information. For example, information regarding traffic patterns, gridlock history, etc. may be incorporated by apparatus 400 in order to build a more accurate gridlock risk profile and improve the gridlock models. Accordingly, the implementation of the gridlock detection and/or ameliorative action generation may be improved via machine learning based on information gathered from neighboring intersections regarding blocking the box risks and ameliorative actions that decrease the incidence of gridlock.

With reference to FIG. 5, flow chart 500 is provided illustrating an overview of a process for ameliorating traffic gridlock conditions.

At step 510, a risk of at least one vehicle blocking an intersection is determined.

At step 520, one or more ameliorative actions are determined or generated based on the risk. Step 520 may comprise causing a computing device associated with the user to display the one or more ameliorative actions. Examples of ameliorative actions that may be generated or determined are discussed above in FIGS. 3 and 4.

At step 530, at least one of the one or more ameliorative actions are performed.

Further details regarding the implementation of the process of FIG. 5 are discussed above with reference to FIGS. 2-4 and below with reference to FIGS. 6 and 7.

With reference to FIG. 6, flow chart 6 is provided illustrating an exemplary process for determining a risk of at least one vehicle blocking an intersection.

At step 610, a set of data associated with a vehicle is received. The set of data may comprise mobility data associated with the vehicle. The mobility data may include, for example, data derived from one or more in-vehicle sensors, data derived from nearby vehicles, mobile device (e.g., smartphone) data, location history data, congestion level data, etc. Upon receipt, the set of data may be stored in a database, which may be a Cloud-based database.

At step 620, an occurrence of a gridlock event is predicted based on the set of data.

At step 630, one or more risk factors are identified in the set of data. The one or more risk factors may include, but are not limited to, one or more of traffic light timings, driving speed, proximity sensor or GPS, types of vehicles near the intersection (e.g., tall trucks), time of day (including day versus night), weather and road conditions, a history of blocking the box at the intersection, the type of intersection and nearby accident conditions.

At step 640, one or more gridlock detection models are determined. The one or more gridlock detection models may be based on one or more of the predicted occurrence of the gridlock event, the first set of mobility data, and the one or more risk factors.

At step 650, the risk that the vehicle will block the intersection is determined based on the one or more gridlock detection models. In one embodiment, step 650 comprises detecting or predicting that the intersection will be blocked (e.g., the box will be blocked) within a proximity distance L. This determination may be performed using one or more in-vehicle sensors and may be based on, for example, traffic light timings, vehicle speed, proximity sensor or GPS, deep learning or visual analytics, etc. Techniques for calculating proximity distance are known in the art, and a further description of such techniques will not be provided herein.

The process of FIG. 6 may be used to generate or determine one or more ameliorative actions based on the risk factors and the set of data in order to prevent the vehicle from causing a gridlock event.

With reference to FIG. 7, flow chart 700 is provided illustrating an exemplary process for determining a risk of at least one vehicle blocking an intersection.

At step 710, a first vehicle located behind a second vehicle is identified. The second vehicle may be a vehicle occluding a view of the first vehicle. For example, the second vehicle may be a large vehicle, such as a truck.

At step 720, at least a first set of data associated with the first vehicle is received. The first set of data may comprise mobility data associated with the first vehicle. The mobility data may include, for example, data derived from one or more in-vehicle sensors, data derived from nearby vehicles, smartphone data, location history data, congestion level data, etc. Upon receipt, the set of data may be stored in a database, which may be a Cloud-based database. In one embodiment, a second set of data associated with the second vehicle may also be received.

At step 730, an occurrence of a gridlock event is predicted based at least on the first set of data.

At step 740, one or more risk factors are identified in the set of data. The one or more risk factors may include, but are not limited to, one or more of traffic light timings, driving speed, proximity sensor or GPS, types of vehicles near the intersection (e.g., tall trucks), time of day (including day versus night), weather and road conditions, a history of blocking the box, the type of intersection and nearby accident conditions.

At step 750, one or more gridlock detection models are determined. The one or more gridlock detection models may be based on one or more of the predicted occurrence of the gridlock event, the first set of mobility data, and the one or more risk factors.

At step 760, the risk that the first vehicle will block the intersection is determined based on the one or more gridlock detection models. In one embodiment, step 760 comprises detecting or predicting a blocking of the box at an intersection within a proximity distance L. This determination may be performed using one or more in-vehicle sensors and may be based on, for example, traffic light timings, vehicle speed, proximity sensor or GPS, deep learning or visual analytics, etc. Techniques for calculating proximity distance are known in the art, and a further description of such techniques will not be provided herein.

The process of FIG. 7 may be used to generate or determine one or more ameliorative actions based on the risk factors and the set of data in order to prevent the first vehicle and/or the second vehicle from causing a gridlock event.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
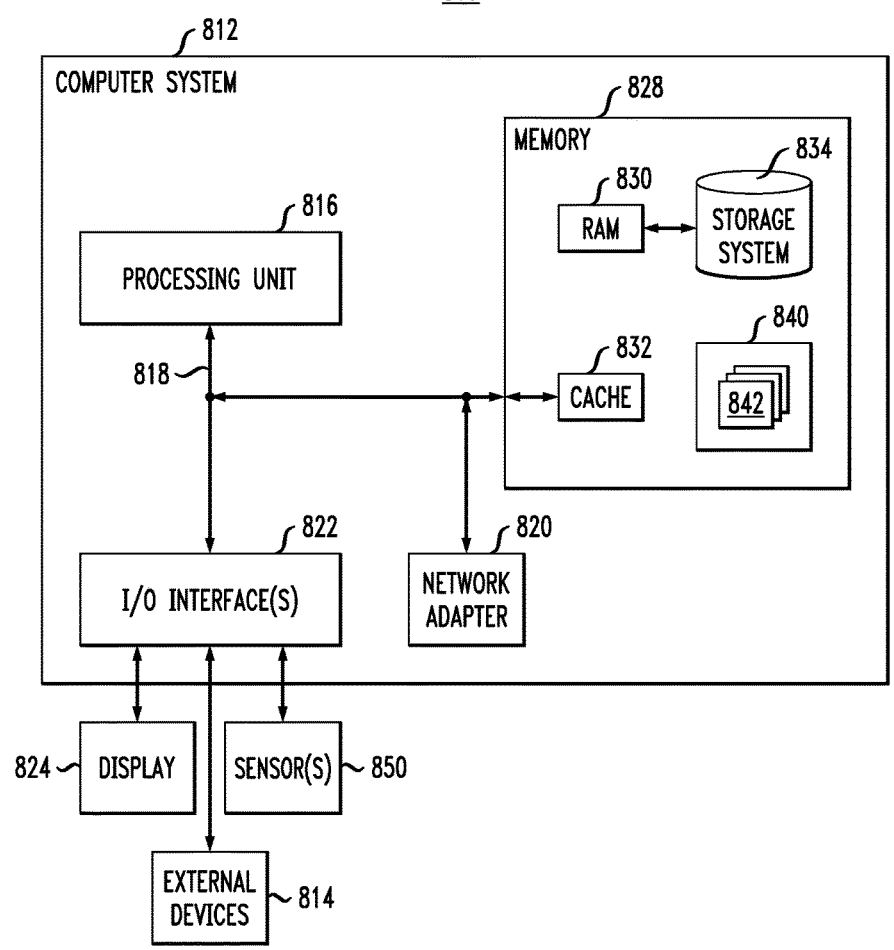
FIG. 8 depicts a computer system in accordance with which one or more components/steps of techniques of the invention may be implemented, according to an embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 312, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via I/O interfaces 822. Still yet, computer system/server 812 can communicate with one or more networks such as a LAN, a general WAN, and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
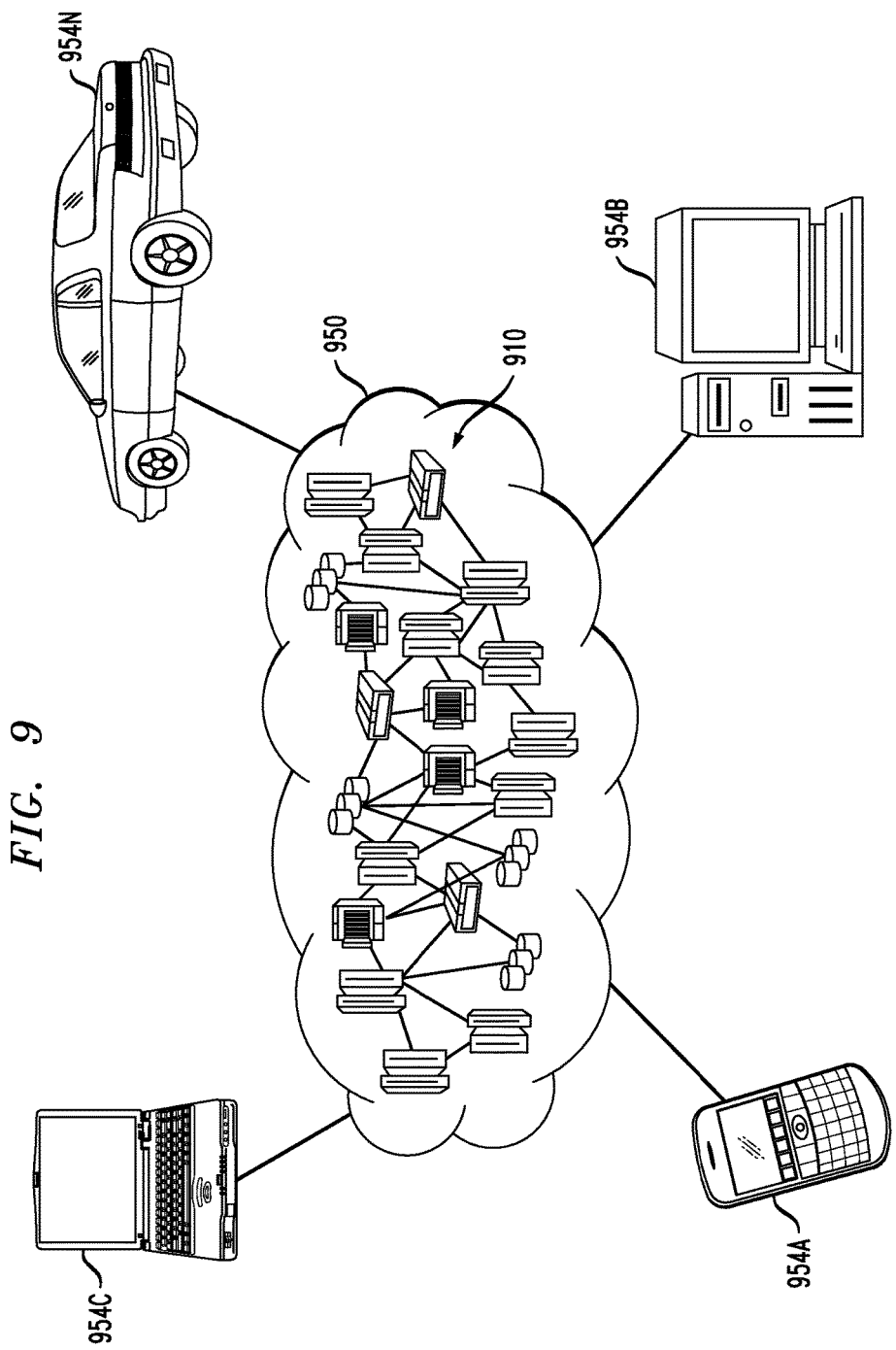
FIG. 9 depicts a cloud computing environment, according to an embodiment of the present invention.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
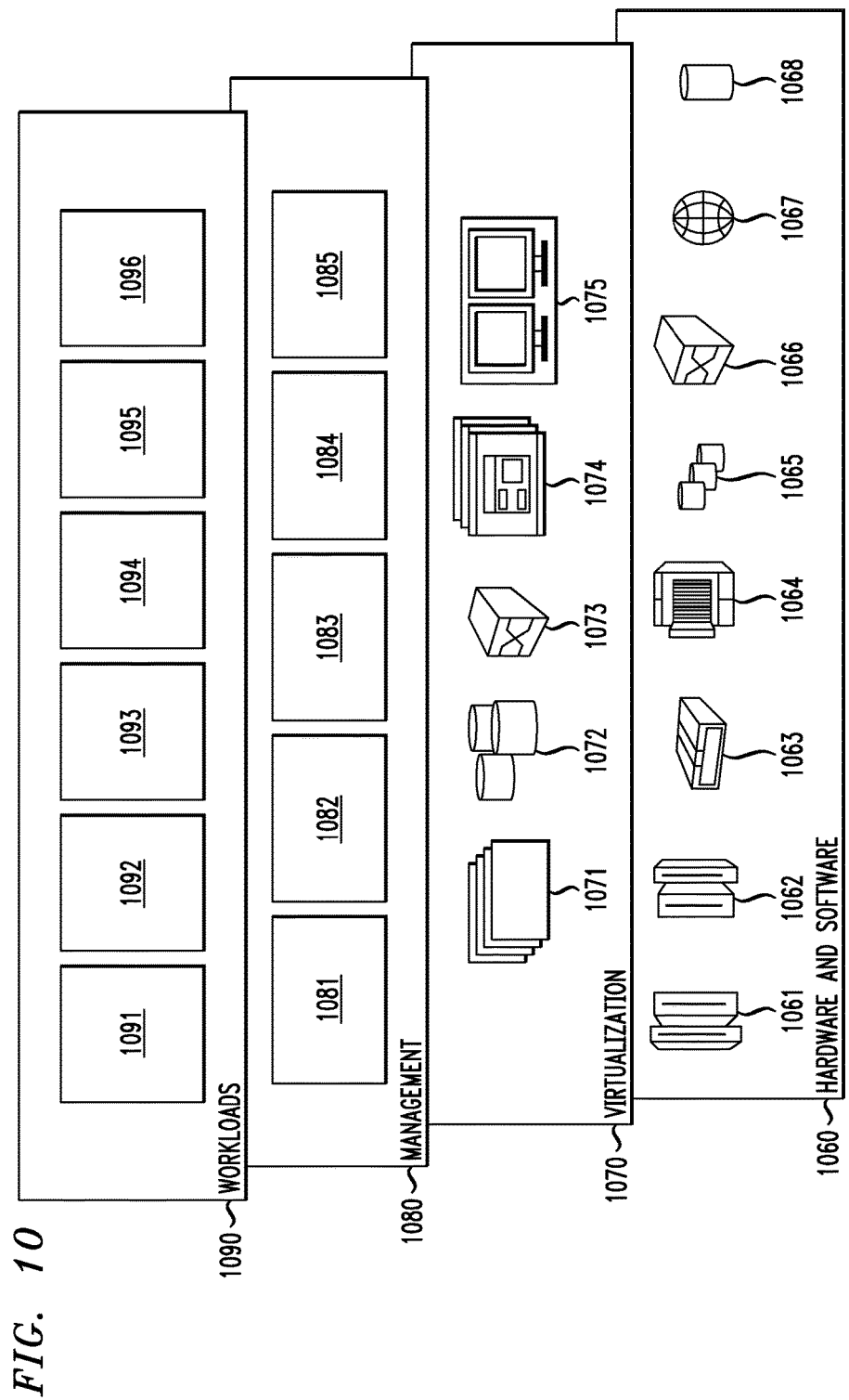
FIG. 10 depicts abstraction model layers, according to an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; data capturing 1093; data analytics processing 1094; risk assessment 1095; and ameliorative action generation 1096, which may perform one or more of the functions described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining a risk of at least one vehicle blocking an intersection;
    determining one or more ameliorative actions based on the risk; and
    performing at least one of the one or more ameliorative actions;
    wherein, in response to identifying a first vehicle located behind a second vehicle, determining the risk further comprises:
        receiving at least a first set of data associated with the first vehicle;
        predicting an occurrence of a gridlock event at the intersection based at least on the first set of data;
        identifying one or more risk factors in the first set of data;
        determining one or more gridlock detection models based on one or more of the predicted occurrence of the gridlock event, the first set of data, and the one or more risk factors; and
        determining a risk that the first vehicle will block the intersection based on the one or more gridlock detection models, and
    wherein the one or more ameliorative actions comprise each of displaying a visualization of a status associated with the intersection to the first vehicle, transmitting an alert message to a computing device associated with the first vehicle, and transmitting a signal to control the first vehicle;
    wherein the steps of the method are implemented by at least one processing device comprising a processor operatively coupled to memory.

2. The method of claim 1, wherein determining the risk comprises receiving a set of data associated with the vehicle.

3. The method of claim 2, wherein determining the risk further comprises predicting an occurrence of a gridlock event at the intersection based on the set of data.

4. The method of claim 2, wherein determining the risk of blocking the intersection further comprises identifying one or more risk factors from the set of data.

5. The method of claim 4, wherein the one or more risk factors comprise one or more of traffic light timings, driving speed, proximity sensor or GPS, types of vehicles near the intersection, time of day, weather and road conditions, a history of blocking the box at the intersection, a type associated with the intersection, and nearby accident conditions.

6. The method of claim 4, wherein determining the risk of blocking the intersection further comprises determining one or more gridlock detection models based one or more of the predicted occurrence of the gridlock event, the first set of data and the one or more risk factors.

7. The method of claim 6, wherein determining the risk of blocking the intersection further comprises detecting a blockage at the intersection based at least in part on the one or more gridlock detection models.

8. The method of claim 2, wherein the one or more ameliorative actions comprise displaying a visualization associated with a status of the intersection to the vehicle.

9. The method of claim 8, wherein the visualization is displayed on at least one a computing device associated with a dashboard of the vehicle and a computing device associated with a portion of a windshield of the vehicle.

10. The method of claim 1, wherein the signal is transmitted to cruise control functionality of the vehicle.

11. The method of claim 1, wherein the visualization is displayed on a smart body part of the second vehicle.

12. The method of claim 11, wherein one or more of brightness level and color of the smart body part are dynamically adjusted based on an analysis of conditions associated with visibility.

13. The method of claim 11, wherein the visualization is dynamically displayed on the smart body part based on an analysis of activity in the intersection.

14. The method of claim 1, further comprising learning an effectiveness of the one or more ameliorative actions in relation to one or more properties of the intersection, wherein the one or more properties comprise one or more of intersection type, terrain, and elevation.

15. An article of manufacture comprising a processor-readable storage medium for storing processor-readable program code which, when executed, causes a processor to perform the steps of:
    determining a risk of at least one vehicle blocking an intersection;
    determining one or more ameliorative actions based on the risk; and
    performing at least one of the one or more ameliorative actions,
    wherein, in response to identifying a first vehicle located behind a second vehicle, determining the risk further comprises:
        receiving at least a first set of data associated with the first vehicle;
        predicting an occurrence of a gridlock event at the intersection based at least on the first set of data;
        identifying one or more risk factors in the first set of data;
        determining one or more gridlock detection models based on one or more of the predicted occurrence of the gridlock event, the first set of data, and the one or more risk factors; and
        determining a risk that the first vehicle will block the intersection based on the one or more gridlock detection models, and
    wherein the one or more ameliorative actions comprise each of displaying a visualization of a status associated with the intersection to the first vehicle, transmitting an alert message to a computing device associated with the first vehicle, and transmitting a signal to control the first vehicle.

16. An apparatus comprising:

at least one processing device comprising a processor operatively coupled to a memory and configured to:

determine a risk of at least one vehicle blocking an intersection;

determine one or more ameliorative actions based on the risk; and perform at least one of the one or more ameliorative actions, wherein, in response to identifying a first vehicle located behind a second vehicle, to determining the risk further comprises:

receiving at least a first set of data associated with the first vehicle;

predicting an occurrence of a gridlock event at the intersection based at least on the first set of data;

identifying one or more risk factors in the first set of data;

determining one or more gridlock detection models based on one or more of the predicted occurrence of the gridlock event, the first set of data, and the one or more risk factors; and determining a risk that the first vehicle will block the intersection based on the one or more gridlock detection models, and wherein the one or more ameliorative actions comprise each of displaying a visualization of a status associated with the intersection to the first vehicle, transmitting an alert message to a computing device associated with the first vehicle, and transmitting a signal to control the first vehicle.

* * * * *